United States Patent
Titus

(10) Patent No.: US 9,496,111 B1
(45) Date of Patent: Nov. 15, 2016

(54) PRONG-LESS NEUTRAL CONNECTOR ASSEMBLIES, CIRCUIT BREAKERS INCLUDING PRONG-LESS NEUTRAL CONNECTOR, PANEL BOARDS WITH FLEXIBLE NEUTRAL BARS, AND NEUTRAL CONNECTION METHODS

(71) Applicant: Siemens Industry, Inc., Alpharetta, GA (US)

(72) Inventor: Solomon R. Titus, Cumming, GA (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 0 days.

(21) Appl. No.: 14/870,188

(22) Filed: Sep. 30, 2015

(51) Int. Cl.
*H02B 1/056* (2006.01)
*H01H 71/02* (2006.01)
*H01H 71/12* (2006.01)
*H01H 69/00* (2006.01)

(52) U.S. Cl.
CPC ......... *H01H 71/0207* (2013.01); *H01H 69/00* (2013.01); *H01H 71/12* (2013.01)

(58) Field of Classification Search
CPC .......... H02B 1/056; H02B 1/04; H02B 1/00; H02B 1/40; H02B 1/42; H01R 25/006; H01H 71/123; H01H 71/7409; H01H 71/08; H01H 9/342
USPC ............... 361/627, 631, 634, 643, 644, 647; 335/6, 202; 200/401, 275, 296
See application file for complete search history.

(56) References Cited

U.S. PATENT DOCUMENTS

| | | | | |
|---|---|---|---|---|
| 3,760,308 A | * | 9/1973 | Misencik | H01H 71/1027 335/35 |
| 5,053,919 A | * | 10/1991 | Schacht | H02B 1/056 361/641 |
| 5,289,148 A | * | 2/1994 | Siglock | H01H 51/12 335/14 |
| 7,744,426 B2 | * | 6/2010 | Zheng | H01R 23/6873 439/660 |
| 7,957,122 B2 | * | 6/2011 | Sharp | H02B 1/056 174/67 |
| 8,049,126 B2 | | 11/2011 | Chen et al. | |
| 8,111,504 B2 | * | 2/2012 | Powell | H01F 27/06 361/42 |
| 8,303,317 B1 | * | 11/2012 | Gao | H01R 12/714 439/660 |
| 8,517,773 B2 | * | 8/2013 | Lee | H01R 12/722 439/660 |
| 8,693,169 B2 | | 4/2014 | Diaz et al. | |
| 8,929,055 B2 | | 1/2015 | Potratz et al. | |
| 8,953,306 B2 | * | 2/2015 | Wheeler | H02B 1/20 174/149 B |
| 9,048,054 B2 | | 6/2015 | Potratz | |
| 2010/0148901 A1 | * | 6/2010 | Powell | H01F 27/06 336/65 |
| 2011/0115585 A1 | * | 5/2011 | Fleege | H01H 83/226 335/10 |
| 2013/0164961 A1 | | 6/2013 | Diaz et al. | |
| 2014/0165390 A1 | | 6/2014 | Potratz et al. | |
| 2014/0321005 A1 | | 10/2014 | Samuelson et al. | |

* cited by examiner

*Primary Examiner* — Gary Paumen

(57) ABSTRACT

A neutral connector assembly for a circuit breaker. Neutral connector assembly includes a molded case of the circuit breaker, and a connector body including a first contact portion configured to make electrical connection with a neutral bar, a second portion having a neutral conductor connected thereto, the connector body being prong-less and securely and immovably mounted to the molded case. Circuit breaker neutral connector includes a first contact portion configured to make electrical connection with a flexible beam of a neutral bar. Circuit breakers including a prong-less neutral connector, panel board assemblies including flexible beams, panel board and circuit breaker assemblies, and methods of making electrical neutral connections are provided, as are other aspects.

20 Claims, 9 Drawing Sheets

PRONG-LESS NEUTRAL CONNECTOR ASSEMBLIES, CIRCUIT BREAKERS INCLUDING PRONG-LESS NEUTRAL CONNECTOR, PANEL BOARDS WITH FLEXIBLE NEUTRAL BARS, AND NEUTRAL CONNECTION METHODS

FIELD

Embodiments of the present invention relate to electronic circuit breakers used for arc fault or ground fault detection, and more specifically to making neutral connections between such electronic circuit breakers and panel boards.

BACKGROUND

As shown in FIG. 1A, electronic circuit breakers 100A according to the prior art that are used for arc fault or ground fault detection, such as Ground Fault Circuit Interrupters (GFCIs) and Combination Arc Fault Circuit Interrupters (CAFCIs) typically include a pigtail wire 102 that is used to connect to a panel board neutral, such as neutral bar. The pigtail wire 102 also connects internally to the electronics of the circuit breaker 100A. In the depicted embodiment, the pigtail wire 102 may have a length of about 13 inches to about 20 inches (about 33 cm to about 51 cm) of 12 AWG wire that is used to connect to the neutral bar on the panel board. Certain electronic circuit breakers 100A may also use mounting features, such as a mounting tab 103, located on the load side of the circuit breaker 100A to help hold the circuit breaker in position on the panel board. During installation, the pigtail wire is unraveled, measured, cut to length, end stripped, the electronic circuit breaker is installed by hooking the mounting tab 103 under a hook of the panel board, and then the pigtail wire 102 is manipulated into place in a neutral bar socket of the neutral bar, and may be held in place with a screw. This is a very labor intensive process.

While most circuit breakers have historically used a pigtail wire 102 to connect to the panel board neutral bar, recently some manufacturers have begun to use a C-clip 104, as shown in FIG. 1B, to connect directly to a neutral bar 130 of the panel board on the underside of the circuit breaker 100B. In this plug-on neutral design, the circuit breaker 100B is pushed directly onto a stab on the line side and also directly onto a panel board neutral bar on the load side.

Existing pigtail neutral designs have a disadvantage of relatively high installation costs when an installer unravels, measures, cuts to length, strips the end of insulation, and then manipulates the pigtail wire 102 to insert the stripped end into a neutral socket of the neutral bar. Some existing C-clip designs, such as shown in FIG. 1B, have the disadvantage that once the electronic circuit breaker is plugged onto the line side stab and neutral bar, there is limited ability to capture the breaker from coming off (becoming unplugged) or moving around.

Accordingly, there is a need for improved methods and apparatus for connecting the circuit breaker neutral to the neutral bar of the panel board.

SUMMARY

In accordance with a first aspect, a neutral connector assembly for a circuit breaker is provided. The neutral connector assembly includes a molded case portion of the circuit breaker; and a connector body including a first contact portion configured to make electrical connection with a neutral bar, and a second portion having a neutral conductor connected thereto, the connector body being prong-less and immovably mounted to the molded case portion.

According to another aspect, a circuit breaker is provided. The circuit breaker includes a molded case including a pocket, and a neutral connector rigidly secured in the pocket, the neutral connector comprising a connector body including a first contact portion configured to make electrical connection with a neutral bar, a tab, a neutral conductor connected to the tab, and wherein the connector body is devoid of prongs.

According to a third aspect, a panel board is provided. The panel board includes a panel board body made of an insulating material, and a neutral bar coupled to the panel board body, the neutral bar including one or more flexible beams, each flexible beam including a breaker contact portion on the flexible beam configured to make electrical connection with a neutral connector of a circuit breaker.

According to another aspect, a panel board and circuit breaker assembly is provided. The panel board and circuit breaker assembly includes a panel board, including a panel board body made of an insulating material, and a neutral bar coupled to the panel board body, the neutral bar including one or more flexible beams, each of the one or more flexible beams including a breaker contact portion; and a circuit breaker, including a molded case including a pocket, and a connector body rigidly and immovably secured in the pocket, the connector body being devoid of prongs, the connector body including a first contact portion configured to make electrical connection with the breaker contact portion of the one or more flexible beams, a tab, and a neutral conductor connected to the tab.

According to another aspect, a method of making a neutral connection between a circuit breaker and a panel board is provided. The method includes providing a panel board including a panel board body of an insulating material and a neutral bar including one or more flexible beams each including a breaker contact portion, providing a circuit breaker coupleable to the panel board, the circuit breaker including a prong-less neutral connector configured to make electrical contact with a breaker contact portion of the one or more flexible beams, and connecting the prong-less neutral connector to the one or more flexible beams to make the electrical neutral connection.

Still other aspects, features, and advantages of the present invention may be apparent from the following description and example embodiments, including the best mode contemplated for carrying out the present invention. The present invention may be capable of different embodiments, and its details may be modified without departing from the scope of the present invention. The invention is to cover all modifications, equivalents, and alternatives within the scope of the appended claims.

BRIEF DESCRIPTION OF DRAWINGS

The drawings, described below, are provided for illustrative purposes only and are not necessarily drawn to scale. The drawings are illustrative and not intended to limit the scope of the invention in any way. Wherever possible, the same or like reference numbers will be used throughout the drawings to refer to the same or like parts.

DESCRIPTION

To assist in making the circuit breaker neutral connection process faster, it is desirable to remove the pigtail wire and replace it with a quick-connect feature.

One or more embodiments of the present invention utilize a neutral connector assembly that is prong-less (i.e., lacking connection prongs) to enable making a rapid electrical neutral connection to a neutral bar of a panel board in accordance with one or more embodiments. Novel prong-less neutral connectors and neutral bars including flexible beams are described herein.

According to one or more embodiments, the electrical neutral connection is made by installing the circuit breaker including a neutral connector assembly that is prong-less onto a panel board including a neutral bar including one or more flexible conductors (e.g., flexible beams such as leaf springs), as will be apparent from the following. The neutral connector assembly is prong-less and is rigidly retained in locating features formed in a molded case of the circuit breaker so that the connector body of the neutral connector assembly is immovable therein.

In some embodiments, the prong-less neutral connector assembly makes engaging electrical contact, upon installation onto the panel board, with a flexible portion of a novel neutral bar, which is flexed upon installation of the circuit breaker to a panel board to ensure proper electrical contact force is provided between the neutral connector assembly and the neutral bar.

These and additional embodiments of the prong-less neutral connector assembly, circuit breakers including a prong-less neutral connector assembly, panel boards including neutral bars with flexible beams, and methods of making an electrical neutral connection between a prong-less neutral connector assembly and a flexible neutral bar of a circuit breaker are provided and fully described with reference to FIGS. 2 through 5 herein.

Figure 2:
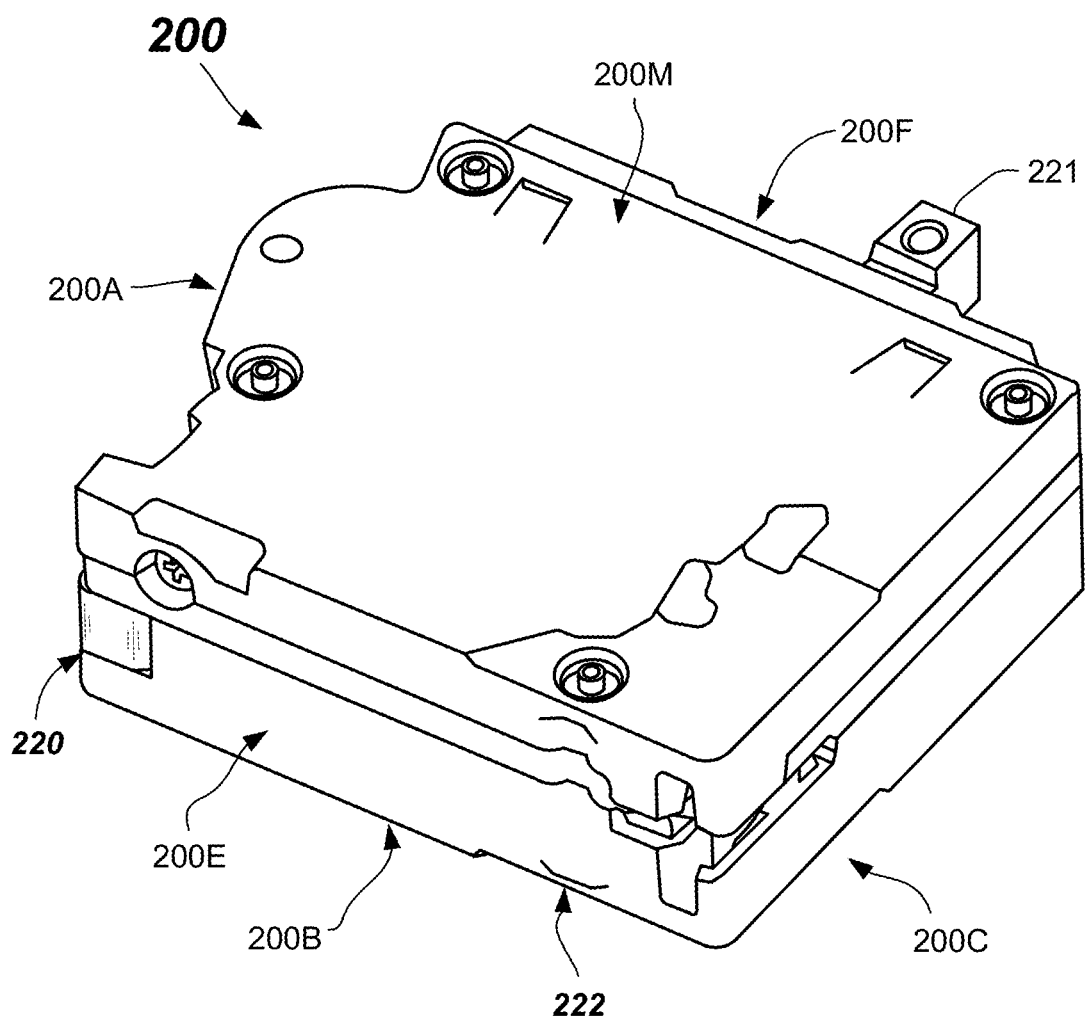
FIG. 2 illustrates an isometric view of a single-pole circuit breaker (e.g., GFCI or CAFCI) including a prong-less neutral connector in accordance with one or more embodiments.

Referring now to FIG. 2, an isometric view of a circuit breaker 200 including a neutral connector assembly 220 that is prong-less is illustrated. The term "prong-less" as used herein means that the neutral connector does not include one or more connection prongs which straddle and clamp over the neutral bar, but instead makes contact by directly abutting with the neutral bar with a normal contact force. Circuit breaker 200 (shown on its side) includes a front side 200F including a breaker handle 221, a rear side (or bottom) 200B that is configured to mount to front side of a panel board (not shown in FIG. 2), a load side 200A to which electrical loads (e.g., branch circuits) may be attached, and a line side 200C, which may attach to a line conductor (e.g., a stab on the panel board) via a conventional c-clip line side terminal connector not shown. Such line side terminal connectors are described in U.S. Pat. No. 8,049,126 to Chen, et al., for example. Other types of line side terminals may be used.

The circuit breaker 200 may include a mechanism pole 200M containing conventional tripping components, such as a cradle, cradle spring, moving contact arm, moving and stationary electrical contacts, armature, and a thermal assembly of magnet and bimetal, for example. The circuit breaker 200 may include an electronic pole 200E that is configured to contain all of the conventional electronics, sensor(s), actuator, and other circuit components for sensing and determining the existence of an arc fault and/or ground fault condition and causing automatic tripping the circuit breaker 200. The components of the mechanism pole 200M and the electronic pole 200E, other than the prong-less neutral connector assembly 220 and portions of the molded case 222 receiving the prong-less neutral connector assembly 220 are conventional and will not be discussed further herein.

In the depicted embodiment, the neutral connector assembly 220 is shown located on the rear side (or bottom) 200B and toward the load side 200A of the electronic pole 200E. However, other locations on the circuit breaker 200 may be used. Furthermore, while the circuit breaker 200 shown and described is a single-pole, embodiments of the invention may be adapted for use with two-pole or multi-pole electronic circuit breakers, as well.

Figure 3A:
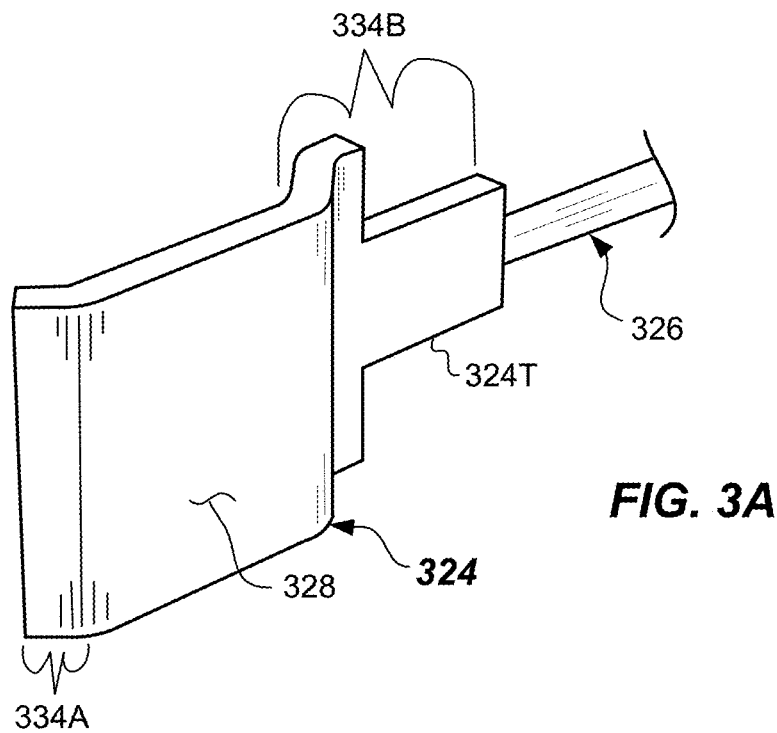
FIG. 3A illustrates an isometric view of a prong-less neutral connector in accordance with one or more embodiments.
Figure 3B:
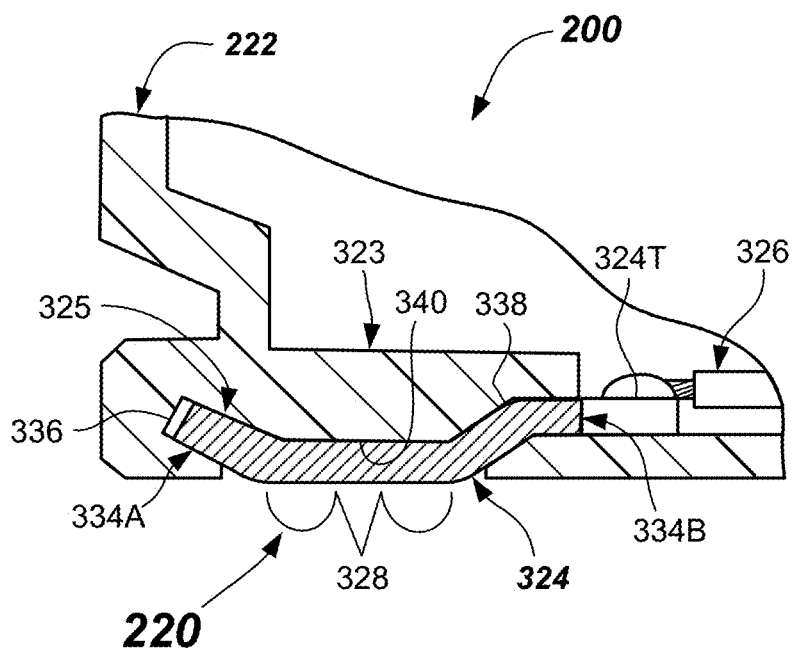
FIG. 3B illustrates a partial cross-sectioned side view of a prong-less neutral connector in accordance with one or more embodiments.
Figure 3C:
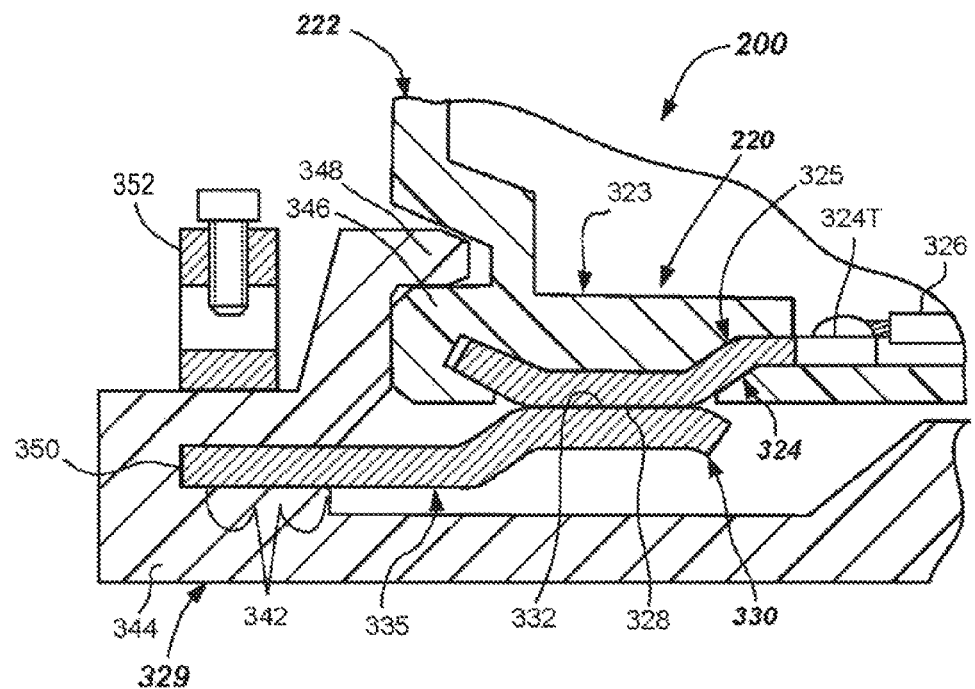
FIG. 3C illustrates a partial cross-sectioned side view of a prong-less neutral connector making an electrical neutral connection with a flexible beam of a neutral bar in accordance with one or more embodiments.

Now referring to FIGS. 3A-3C, the neutral connector assembly 220 for a circuit breaker 200 (only a portion is shown in FIGS. 3B-3C) and a connection to a panel board 329 is shown and described. The neutral connector assembly 220 includes a molded case portion 323 of the molded case 222 (only a portion shown) that is configured to immovably support a connector body 324 that is received in a pocket 325 of the molded case portion 323. The neutral connector assembly 220 further includes a neutral conductor 326 attached thereto (only a portion shown). The neutral conductor 326 may be fastened to the connector body 324, such as by welding to a tab 324T thereof (FIG. 3B). In one or more embodiments, the tab 324T may be offset from a plane of contact of the first contact portion 328, i.e., offset from the flat surface of the first contact portion 328. Neutral conductor 326 may attach internally to the electronics of the electronic pole 200E, as is conventional. Neutral conductor 326 may be a 12 AWG copper conducting wire, and may have an insulating polymer coating thereon, for example. Other configurations of the neutral conductor 326 may be used, such as a conductor strap, or even making the neutral conductor 326 integral with the connector body 324.

As will be apparent from the following, the connector body 324 is prong-less and immovably mounted to the molded case 222. That is, the connector body 324 is securely fastened and remains stationary relative to the molded case 222 during the electrical connection to the neutral bar 330.

Figure 3D:
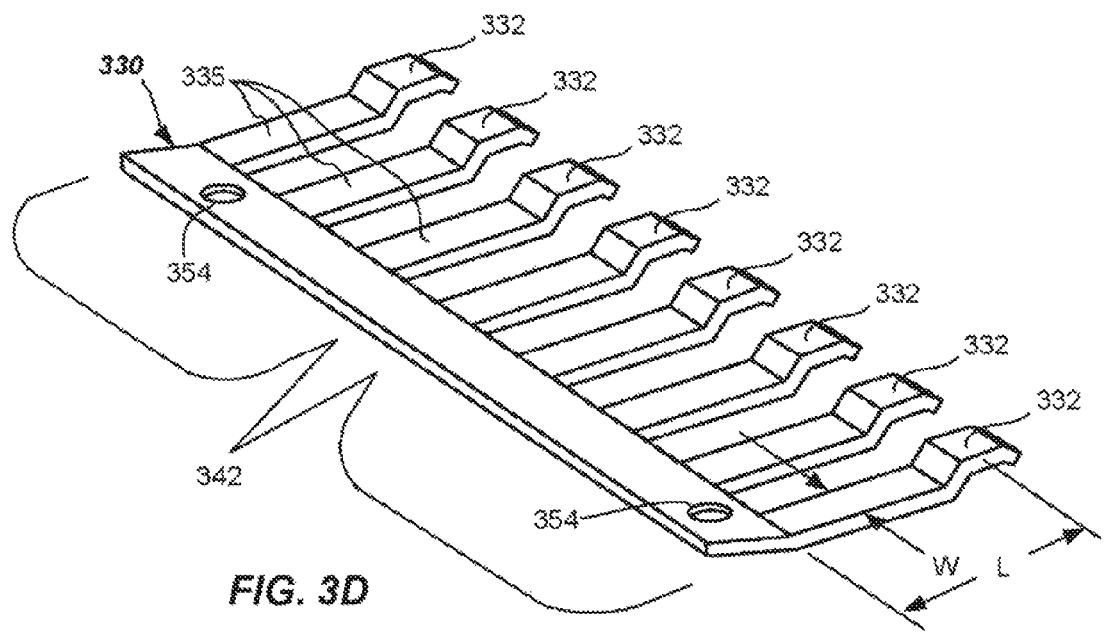
FIG. 3D illustrates an isometric view of a neutral bar including flexible beams in accordance with one or more embodiments.

In more detail, the connector body 324 includes a first side comprising the first contact portion 328 that is configured to make electrical connection with the neutral bar 330, as is best shown in FIG. 3C. The first contact portion 328 of the connector body 324 may include a flat surface on the first side that is configured to make electrical contact with a breaker contact portion 332 (See FIG. 3D) of a flexible beam 335 (a few labeled) of the neutral bar 330, as is shown in FIGS. 3C and 3D. Breaker contact portion 332 may also be a flat surface. Flat surfaces of the first contact portion 328 and of the breaker contact portion 332 may have a generally rectangular shape and may be between about 5 mm to about 9 mm wide and about 5 mm to about 9 mm long, or even between about 5 mm wide and about 7 mm long in some embodiments, for example. The first contact portion 328 and the breaker contact portion 332 may have an electrical contact area of at least about 25 mm$^2$, or even at least about 30 mm$^2$, and about 35 mm$^2$ in some embodiments, for example, depending on the amperage rating of the circuit breaker 200. Other contact sizes, contact areas, and surface area shapes may be used. Connector body 324 and neutral bar 330 may be made of a conductive material such as a copper alloy material, such as CDA 510 material, for example. Other suitably electrically-conductive materials may be used, such as aluminum.

Connector body 324 and the neutral bar 330 may include a large radius (e.g., about 1.5 mm) on the respective ends of the flat surfaces of the first contact portion 328 and the breaker contact portion 332 to help aid in the assembly process and to reduce scraping or abrasion between the neutral connector assembly 220 and the neutral bar 330 of the panel board 329 upon assembly.

Connector body 324 may include a first end portion 334A and a second end portion 334B opposite the first end portion 334A. The first end portion 334A may be configured to be received and retained within a first recess 336 of the molded case portion 323 (FIG. 3B). Likewise, the second end portion 334B of the connector body 324 may be configured to be received and retained in a second recess 338 of the molded case portion 323. The fit between the first recess 336, the second recess 338 and the respective first end portion 334A and second end portion 334B may be a line fit, or even slight press fit, for example, so that the connector body 324 is securely and immovably held therein. In one or more embodiments, the molded case 222 may include a backing portion 340 directly abutting with the connector body 324 on a side opposite from the first contact portion 228 to further support the connector body 324.

Figure 1A:
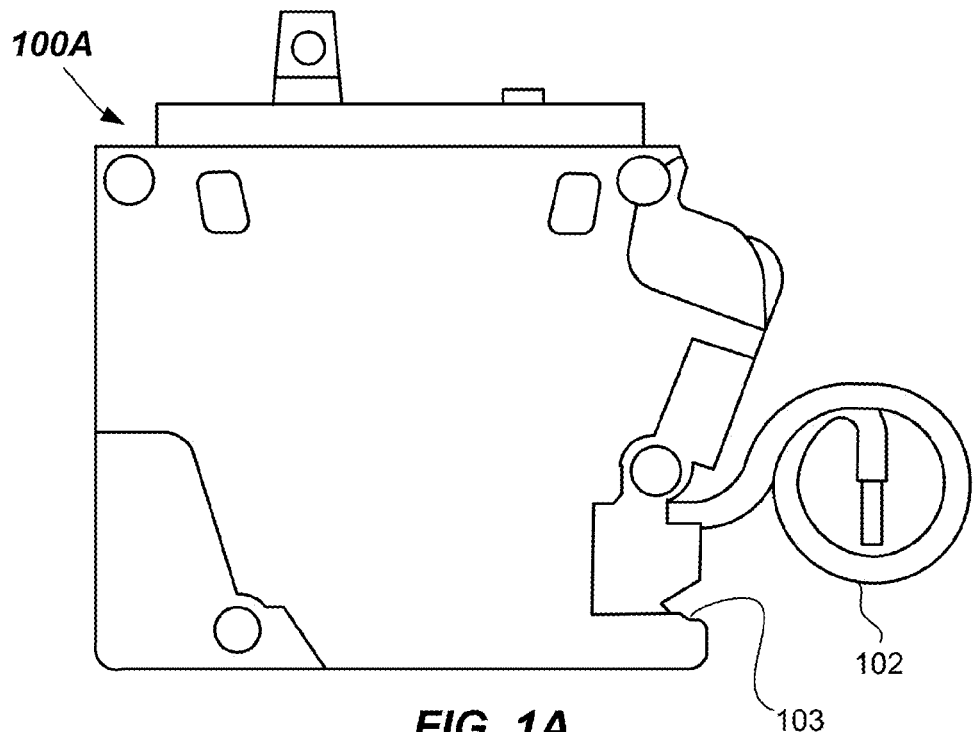
FIGS. 1A and 1B illustrate side views of a conventional electronic circuit breaker (e.g., GFCI or CAFCI) with a coiled pigtail (FIG. 1A), and conventional electronic circuit breaker (e.g., GFCI or CAFCI) with C-clip connector (FIG. 1B) adapted to plug onto a neutral bar in accordance with the prior art.
Figure 1B:
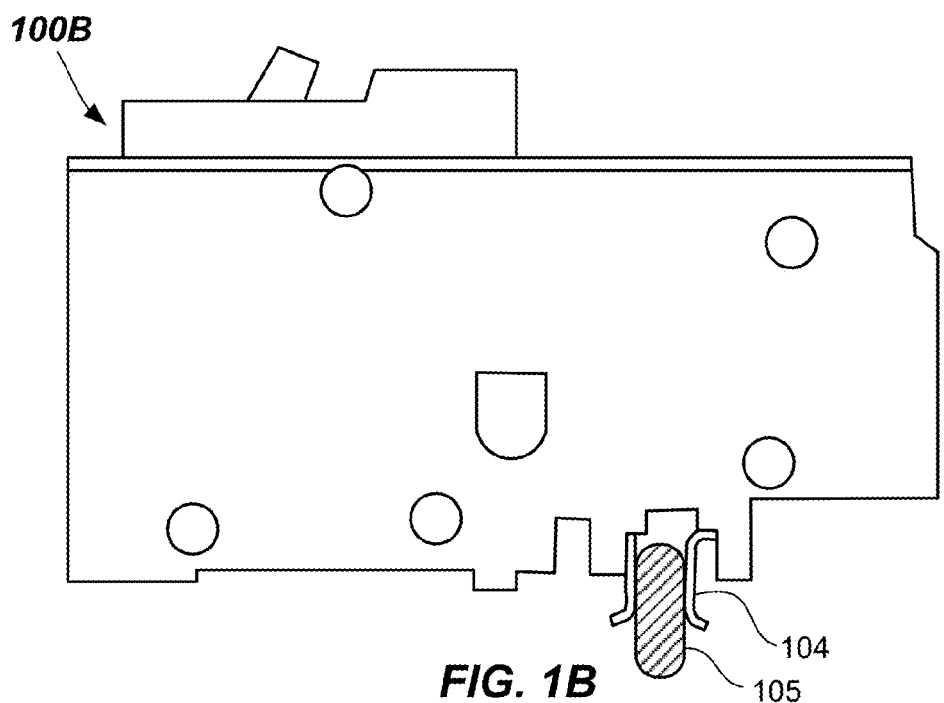

In another aspect, a circuit breaker 200 is provided. The circuit breaker includes the molded case 222 wherein the molded case portion 323 thereof includes the pocket 325 formed therein. The pocket 325 may be provided by the interaction of the various molded case parts. For example, the pocket 325 may be formed solely in the electronic pole 200E, or part in the mechanism pole 200M and part of the electronic pole 200E, for example. Further, the circuit breaker 200 includes the connector body 324 rigidly secured in the pocket 325. The connector body 324 includes the first contact portion 328 configured to make electrical connection with a neutral bar 330 (FIG. 3C), the tab 324T, the neutral conductor 326 connected to the tab 324T, and wherein the connector body 324 is devoid of prongs, i.e., is prong-less. Being prong-less means that the connector body 324 includes no prongs, which would be connected over the neutral bar 330 as in the circuit breakers of the prior art (See FIG. 1B).

Now referring to FIGS. 3C, 3D, and 3E, the panel board 329, and the components and function thereof will now be described. The panel board 329 includes a panel board body 344 made of an insulating material, such as a polymer (e.g., Nylon), and the neutral bar 330 suitably coupled to the panel board body 344. In one or more embodiments, the neutral bar 330 includes one or more flexible beams 335. Each flexible beam 335 may extend from a base portion 342 and each flexible beam 335 includes a breaker contact portion 332 located on the flexible beam 335, such as at an end thereof. The breaker contact portion 332 is configured to make electrical connection with the first contact portion 328 of the connector body 224 of the circuit breaker 200 upon assembly of the circuit breaker 200 to the panel board 329. The breaker contact portion 332 may include a flat surface similar to the first contact portion 328. Each of the flexible beams 335 may have a suitable stiffness to allow flexing. Flexing of between about 0.5 mm to 3 mm, or even between about 0.5 mm to about 1.5 mm, upon assembly of the circuit breaker 200 to the panel board 329 may be provided. Each flexible beam 335 may provide the ability to flex by including a spring rate thereof of between about 4.4 N/mm and about 44 N/mm, or even between about 8.6 N/mm and about 26 N/mm in some embodiments, for example. The flexible beams 335 may have a rectangular cross-section, and may include a length L measured from an edge of the base portion 342 to a physical center of the breaker contact portion 332 of between about 10 mm and about 50 mm, or even between about 10 mm and about 25 mm in some embodiments, for example. The flexible beams 335 may include an average width W measured across the flexible beam 335 of between about 5 mm and about 9 mm, for example. As shown, the width W is constant along the length L, but tapered beams or beams of varying width W may be used. Other sizes and configurations of the flexible beams 335 may be used other than the leaf springs shown.

As is shown in FIG. 3C, when a nose tab 346 of the molded case 222 of the circuit breaker 200 is received under a hook member 348 of the panel board 329 and the circuit breaker 200 is installed onto the panel board 329, the first contact portion 328 of the connector body 324 contacts the breaker contact portion 332 of the flexible beam 335. This elastically deflects the flexible beam 335, as shown, and provides a contact force of greater than about 13 N, and between about 13 N and about 22 N, or even about 18 N in some embodiments, for example. Other contact forces may be used. The flexible beams 335 are attached to the base portion 342, and the base portion 342 may extend along a length of the panel board body 344. The base portion 342 may be planar in shape, and may be rigidly coupled to the panel board body 344 by any suitable means. For example, as shown in FIG. 3C, the base portion 342 may be captured in a recess 350 formed in the panel board body 344, and may be secured in place using fasteners (e.g., screws, studs and nuts, or the like—not shown in FIG. 3C). Connection between a neutral terminal 352 and the neutral bar 330 may be made by securing a screw through holes 354 in the neutral bar 330 or otherwise fastening the neutral terminal 352 to the neutral bar 330. Other ways of connecting and attaching the base portion 342 to the panel board body 344 may be used.

Figure 3E:
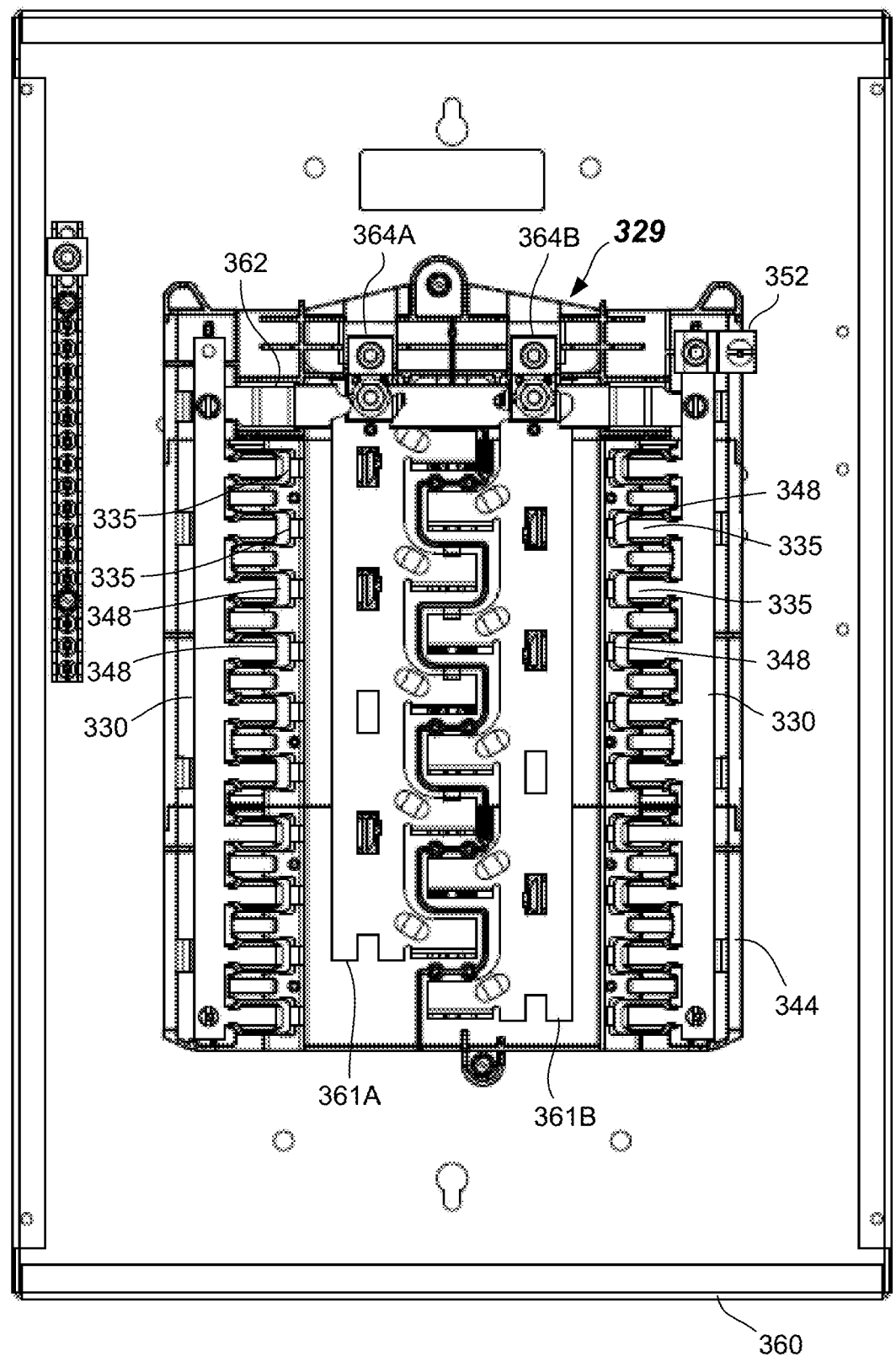
FIG. 3E illustrates a front plan view of a panel board mounted in an enclosure and including a neutral bar including flexible beams in accordance with one or more embodiments.

FIG. 3E illustrates a front plan view of the panel board 329 mounted in an enclosure 360 with the front cover removed for illustration purposes. The panel board 329 may include an A phase bus 361A and a B phase bus 361B mounted to the front of the panel board body 344, each including line side stabs along the length for coupling to the line sides of the various circuit breakers adapted to couple to the panel board 329. Panel board 329 includes neutral bars 330 including the flexible beams 335 (FIG. 3D) mounted on both sides of the panel board body 344. In this embodiment, neutral bars 330 may be mounted to the front surface of the panel board body 344 by screws, studs and nuts, or the like. In this embodiment, rather than being partly received in a recess 350 in the panel board body 344, such as is shown in FIG. 3C, the neutral bars 330 may be coupled directly to the front face of the panel board body 344. The flexible beams 335 (a few labeled in FIG. 3E) may extend through holes located at the base of the hook members 348 (a few labeled in FIG. 3E) so they are positioned under the hook member 348 in a similar position as is shown in the FIG. 3D embodiment. Hook members 348 may be reinforced to add strength, such as by adding ribs alongside of the flexible beams 335. Also, a reveal or recess may be added to the panelboard body 344 underneath the flexible beams 335 to allow them to freely flex upon coupling the circuit breakers 200 to the panel board 329. A neutral terminal 352 configured to receive and couple to the main neutral line (not shown) may be provided on one or both sides (for ease of connection) and electrically coupled to the neutral bars 330. A neutral crossbar 362 may electrically interconnect the neutral bars 330 from side to side. The neutral cross bar 362 may pass above the A and B phase terminals 364A, 364B and may be made of a suitably electrically conductive material as described herein.

Figure 4A:
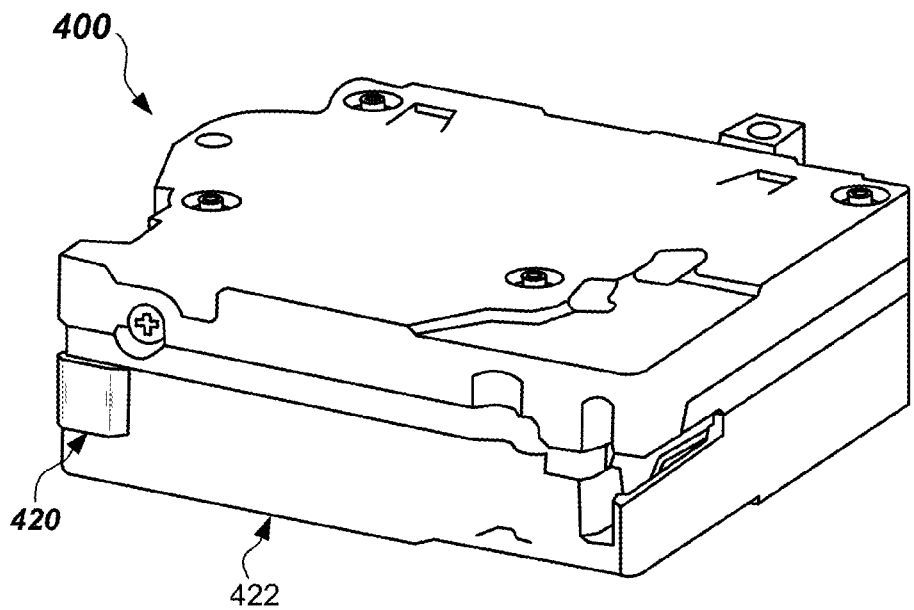
FIGS. 4A and 4B illustrate isometric views of a circuit breaker including a prong-less neutral connector in accordance with one or more additional embodiments.
Figure 4B:
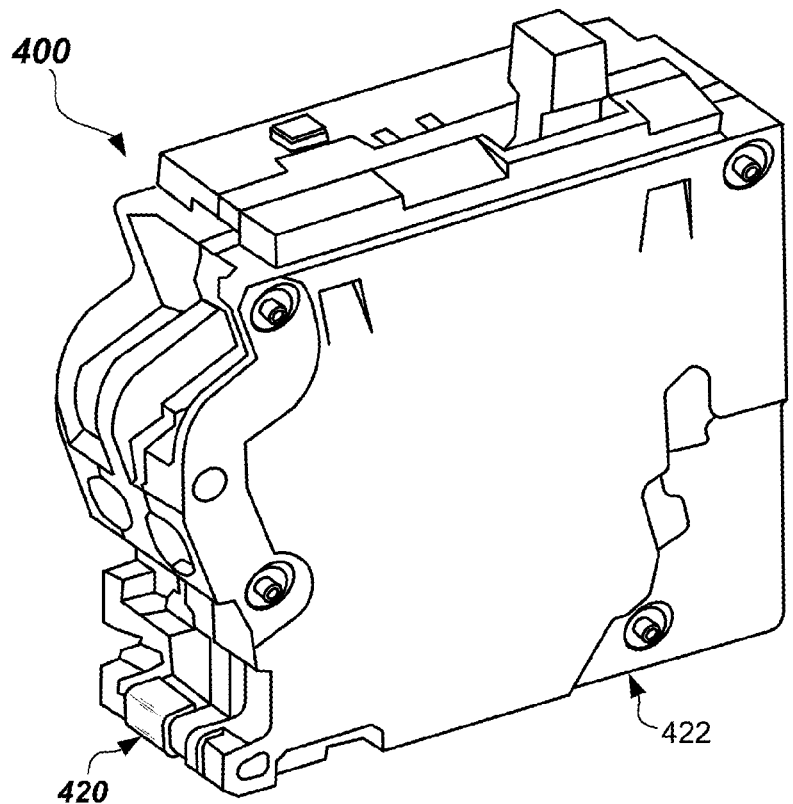
Figure 4C:
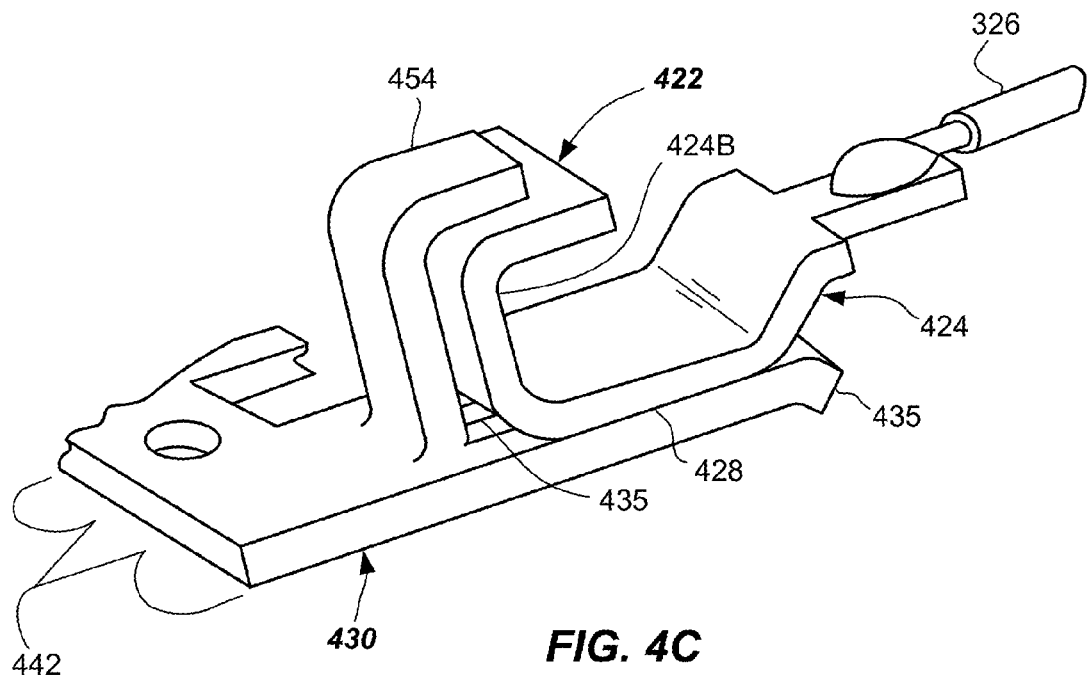
FIG. 4C illustrates a partial isometric view of a prong-less neutral connector interfacing with a neutral bar including flexible beams in accordance with one or more additional embodiments.
Figure 4D:
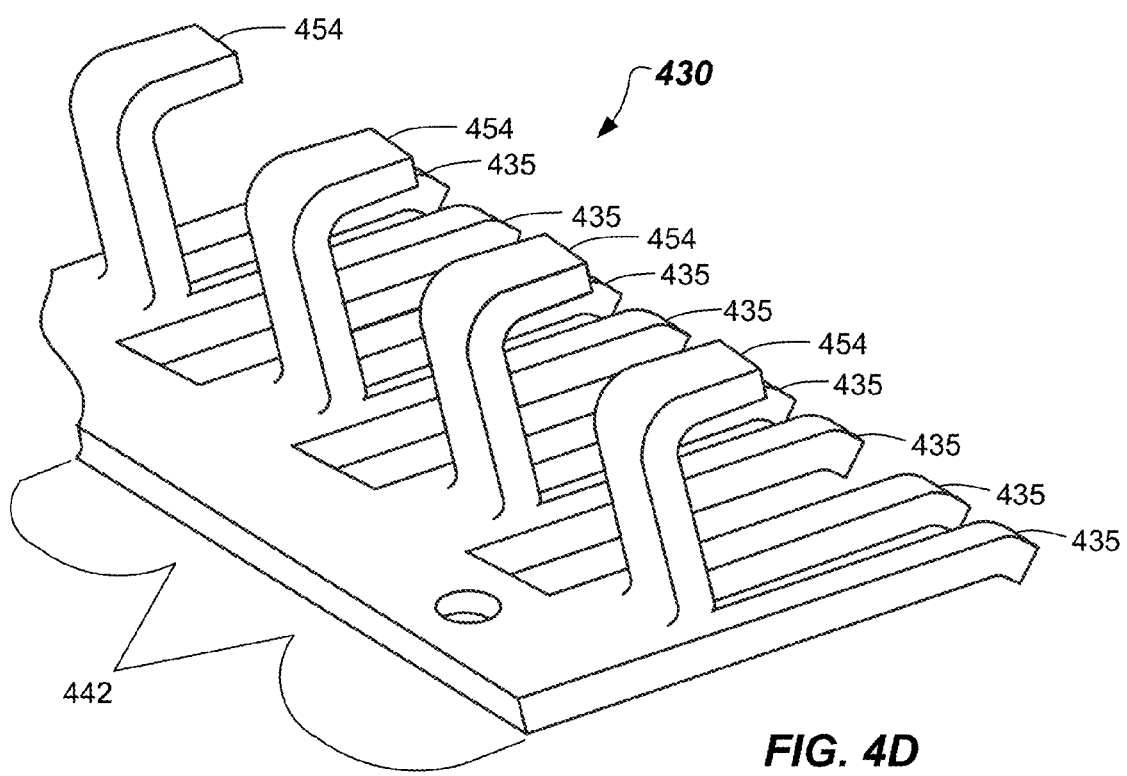
FIG. 4D illustrates a partial isometric view of a neutral bar including flexible beams in accordance with one or more additional embodiments.
Figure 4E:
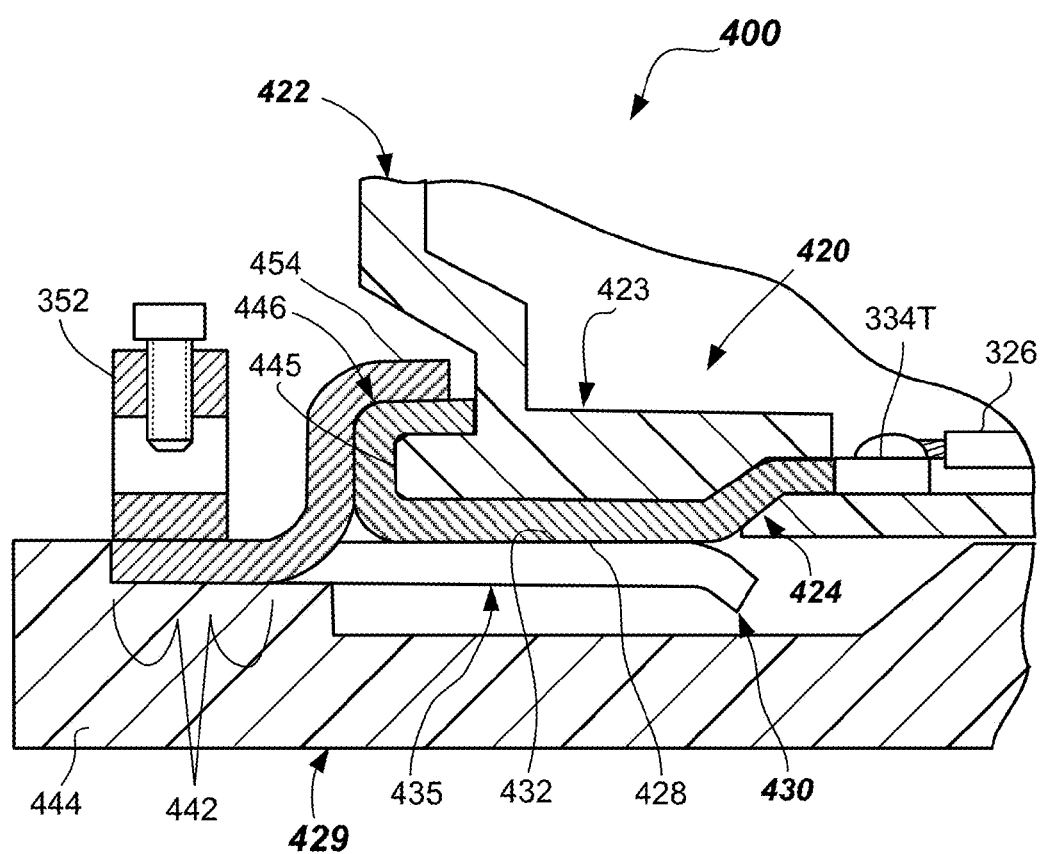
FIG. 4E illustrates a partial cross-sectioned side view of a circuit breaker and panel board assembly showing an electrical neutral connection between a prong-less neutral connector and a neutral bar including flexible beams in accordance with one or more additional embodiments.

An alternate embodiment of a circuit breaker 400 including a neutral connector assembly 420 and components thereof and an alternate embodiment of a panel board 429 are shown and described with reference to FIGS. 4A-4E herein. In this embodiment, the contact force providing connection between the connector body 424 and the neutral bar 430 is accomplished by using a spring force provided by the neutral bar 430, as in the previous embodiment. Further, as before, the connector body 424 is devoid of prongs. However, in this embodiment, the connector body 424 is configured with a U-shaped portion 424B that wraps around a nose (e.g., a molded nose 445) of the molded case 422 and forms a nose tab 446 of the circuit breaker 400 as is shown in FIG. 4E. As should be recognized, electrical contact with the neutral bar 430 may be made both above and below the molded nose 445.

Neutral connector assembly 420 is designed so that the connector body 424 is rigidly and immovably coupled to the molded case portion 423 of the molded case 422, similar to the previous embodiment. As shown, the circuit breaker 400 (only an end portion is shown) is installed onto the panel board 429 and the neutral connector assembly 420 is provided in electrical engagement with the neutral bar 430. The line side may be coupled to a stab of the A phase or B phase conductors of the panelboard 429. In this embodiment, a contact force of about 18 N may be provided against the first contact portion 428 of the connector body 424 and the breaker contact portion 432 by flexing of flexible beams 435 to ensure a secure electrical neutral connection between the connector body 424 and the neutral bar 430. Other suitable contact forces may be used.

In this embodiment, two flexible beams 435 contact each connector body 424 on the bottom side thereof. Each flexible beam 435 in this embodiment may have a spring rate of between 2.2 N/mm and about 22 N/mm, for example, and may be between about 10 mm and 50 mm long, or even about 13 mm long, for example. Other spring rates and beam lengths may be used. The contact surface area of the first contact portion 428 of the connector body 424 that is configured to make electrical contact with the two flexible beams 435 of the neutral bar 430 may be greater that about 25 mm$^2$, for example.

As shown, the panel board 429 includes a panel board body 444 made of an insulating material, and the neutral bar 430. Another neutral bar 430 may be attached to another side of the panelboard body as was described in FIG. 3E. Neutral bar 430 includes a base portion 442 coupled to the front face of the panel board body 444, such as by fasteners (e.g., screws, studs and nuts, or the like). The base portion 442 may extend along a length of the panel board body 444. Neutral bar 430 may further include the flexible beams 435 that may extend laterally from the base portion 442 and are configured to contact portions the first contact portion 428 of the connector body 224 below the nose tab 446. Neutral bar 430 may further include an upper beam 454 configured to engage the U-shaped portion 424B above the nose tab 446 of the circuit breaker 400. In particular, a portion of the upper beam 454 is configured to contact the connector body 224 above the nose tab 446 and make an electrical connection therewith. In this manner, the neutral bar 430 serves to perform a hook function previously molded into the panel board body 444, but also a conductor function. Thus, as shown, the neutral bar 430 comprises an upper beam 454 and two lower flexible beams 435 opposed to the upper beam 454 that are configured to contact with the connector body 424.

Each of the flexible beams 435 may include a breaker contact portion 432 that is configured to make electrical connection with the first contact portion 428 of the connector body 424 of the circuit breaker 400. The breaker contact portion 432 may be a flat surface. A radius may be provided at the end of each of the flexible beams 435 to reduced scratching of the connector body 424 during assembly. In this embodiment, the flat surface of the breaker contact portion 432 of each flexible beam 435 may have a surface area of at least about 12.5 mm$^2$, for example. Each flexible beam 435 may have a cantilevered spring rate of between 2.2 N/mm and 22 N/mm, and may provide a force applied to the breaker contact portion 432 of about 6.7 N or more, or even between about 6.7 N and about 11 N, for example. The upper beam 454 may be very rigid or itself may have a spring rate providing some degree of flexing upon installation of the nose tab 446 between the upper beam 454 and the flexible beams 435.

Figure 5:
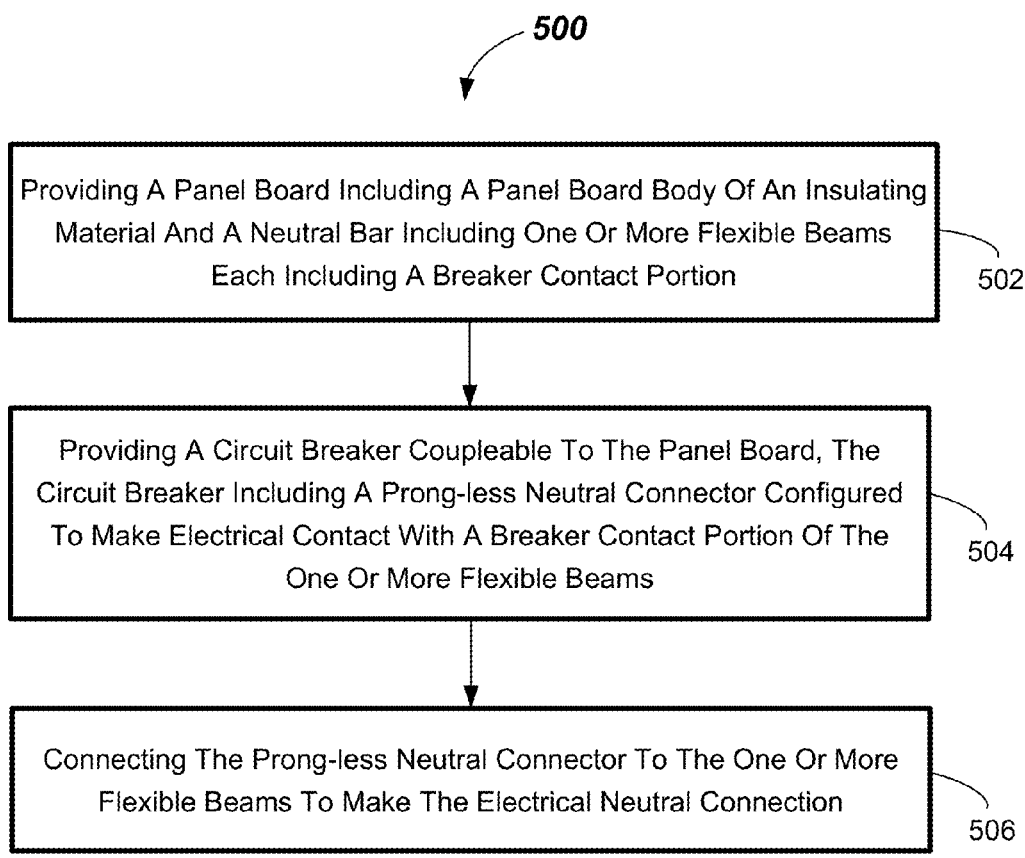
FIG. 5 illustrates a flowchart of a method of making an electrical neutral connection between a prong-less neutral connector of a circuit breaker and a neutral bar including flexible beams of a panel board in accordance with one or more embodiments.

In another aspect, a method of making an electrical neutral connection between a circuit breaker (e.g., circuit breaker 200, 400) and a panel board (e.g., panel board 329, 429) is described with reference to FIG. 5.

In 502, the method 500 includes providing a panel board (e.g., panel board 329, 429) including a panel board body (e.g., panel board body 344, 444) of an insulating material and a neutral bar (e.g., neutral bar 330, 430) including one or more flexible beams (e.g., flexible beams 335, 435) each including a breaker contact portion (e.g., breaker contact portion 332, 432).

The method 500 includes, in 504, providing a circuit breaker (e.g., circuit breaker 200, 400) coupleable to the panel board (e.g., panel board 329, 429), the circuit breaker including a prong-less neutral connector (e.g., neutral connector assembly 220, 420) configured to make electrical contact with a breaker contact portion (e.g., breaker contact portion 332, 432) of the one or more flexible beams (e.g., flexible beams 335, 435).

The method 500 includes, in 506, connecting the prong-less neutral connector (e.g., neutral connector assembly 220, 420) to the one or more flexible beams (e.g., flexible beams 335, 435) to make the electrical neutral connection. Upon installation the one or more flexible beams (e.g., flexible beams 335, 435) are flexed and provide the contact force between the connector body (e.g., connector body 324, 424).

While the invention is susceptible to various modifications and alternative forms, specific embodiments and methods thereof have been shown by way of example in the drawings and are described in detail herein. It should be understood, however, that it is not intended to limit the invention to the particular apparatus, assembly or methods disclosed, but, to the contrary, the intention is to cover all modifications, equivalents and alternatives falling within the scope of the claims.

What is claimed is:

1. Neutral connector assembly for a circuit breaker, comprising:
   a connector body including a first contact portion configured to make electrical connection with a neutral bar, a second portion having a neutral conductor connected thereto, the connector body being prong-less and immovably mounted to a molded case portion of the circuit breaker,
   wherein the first contact portion is located on a bottom side of the circuit breaker and towards a load side of an electronic pole, the bottom side of the circuit breaker is configured to mount to a front side of a panel board and
   wherein the first contact portion having a mating surface that is flush with the bottom side of the circuit breaker.

2. The neutral connector assembly of claim 1, wherein the first contact portion comprises a flat surface.

3. The neutral connector assembly of claim 2, wherein the flat surface comprises a surface area of at least 25 mm².

4. The neutral connector assembly of claim 1, wherein the connector body is received in a pocket of the molded case portion.

5. The neutral connector assembly of claim 1, wherein the connector body includes a first end portion configured to be retained in a first recess of the molded case.

6. The neutral connector assembly of claim 5, wherein the connector body includes a second end portion configured to be retained in a second recess of the molded case.

7. The neutral connector assembly of claim 6, wherein the second end portion includes a tab offset from a plane of contact of the first contact portion.

8. The neutral connector assembly of claim 1, wherein the molded case includes a backing portion abutting the connector body on a side opposite from the first contact portion.

9. The neutral connector assembly of claim 1, wherein the connector body includes a first end portion configured to wrap around a nose portion of the molded case.

10. A circuit breaker, comprising:
    a molded case including a pocket;
    a bottom side that is configured to mount to a front side of a panel board; and
    a neutral connector rigidly secured in the pocket, the neutral connector comprising a connector body including:
       a first contact portion configured to make electrical connection with a neutral bar,
       a tab,
       a neutral conductor connected to the tab, and
       wherein the connector body is devoid of prongs,
    wherein the connector body including a first contact portion configured to make electrical connection with the neutral bar,
    wherein the first contact portion is located on the bottom side and towards a load side of an electronic pole, and
    wherein the first contact portion having a mating surface that is flush with the bottom side of the circuit breaker.

11. A panel board, comprising:
    a panel board body made of an insulating material; and
    a neutral bar coupled to the panel board body, the neutral bar including one or more flexible beams, each flexible beam including a breaker contact portion on the flexible beam configured to make electrical connection with a neutral connector of a circuit breaker,
    wherein the neutral bar comprises an upper beam and a lower flexible beam opposed to the upper beam.

12. The panel board of claim 11, wherein the breaker contact portion comprises a flat surface.

13. The panel board of claim 12, wherein the flat surface comprises a surface area of at least about 25 mm².

14. The panel board of claim 11, wherein each flexible beam has a spring rate of between about 2.2 N/mm and about 44 N/mm.

15. The panel board of claim 11, wherein each flexible beam is attached to a base portion that extends along a length of the panel board body.

16. The panel board of claim 11, wherein the neutral bar comprises an upper beam configured to engage a nose tab of a circuit breaker.

17. A panel board, comprising:
    a panel board body made of an insulating material; and
    a neutral bar coupled to the panel board body, the neutral bar including one or more flexible beams, each flexible beam including a breaker contact portion on the flexible beam configured to make electrical connection with a neutral connector of a circuit breaker,
    wherein the neutral bar comprises an upper beam configured to engage a nose tab of a circuit breaker,
    wherein the neutral bar comprises two lower flexible beams opposed to the upper beam.

18. The panel board of claim 17, wherein the breaker contact portion comprises a flat surface.

19. The panel board of claim 17, wherein each flexible beam is attached to a base portion that extends along a length of the panel board body.

20. The panel board of claim 17, wherein the neutral bar comprises an upper beam configured to engage a nose tab of a circuit breaker.

* * * * *